United States Patent

Butler et al.

[11] 3,902,608
[45] Sept. 2, 1975

[54] APPARATUS FOR CONTROLLING BOTH THE PUSH OFF FEET AND THE TIER FORMING TABLE OF A BALE WAGON

[75] Inventors: Gene R. Butler, Kingsburg; Anthony E. Furtado, Riverdale, both of Calif.

[73] Assignee: Sperry Rand Corporation, New Holland, Pa.

[22] Filed: Sept. 4, 1973

[21] Appl. No.: 393,876

[52] U.S. Cl. ................. 214/6 B; 214/82; 214/510
[51] Int. Cl.² ..................... B60P 1/32; B65G 57/32
[58] Field of Search ............ 214/6 B, 6 C, 501, 510, 214/82

[56] References Cited
UNITED STATES PATENTS

| | | | |
|---|---|---|---|
| 2,848,127 | 8/1958 | Grey | 214/6 B X |
| 3,583,578 | 6/1971 | Fachini et al. | 214/6 B |
| 3,788,495 | 1/1974 | Fachini et al. | 214/6 B |

*Primary Examiner*—Robert J. Spar
*Assistant Examiner*—Leslie J. Paperner
*Attorney, Agent, or Firm*—John R. Flanagan; Frank A. Seemar; Joseph A. Brown

[57] ABSTRACT

An automatic bale wagon having a bale pickup for retrieving bales from a field, and forming the retrieved bales into layers, a second or tier forming table for receiving the layers and forming the layers into a tier, and a load bed for receiving and accummulating the tiers into a stack, and depositing the stack at a particular location upon the ground arranged in juxtaposition on a mobile frame. The load bed is pivotable to a generally vertical stack depositing position at which time push off feet are activated to engage the stack. The push off feet's operation is controlled by apparatus which automatically controls and coordinates the operation of both the push off feet and the second or tier forming table. The apparatus includes an extendable and retractable hydraulic cylinder which cooperates with an interconnecting mechanism having means for latching and securing one end of the hydraulic cylinder while the other end is free to operate. The interconnecting mechanism operates to control the hydraulic cylinder in a way such that either a first portion associated with the second or tier forming table will be activated while a second portion associated with the push off feet will be latched and maintained in an inoperative position, or the second portion will be activated while the first portion maintains the second or tier forming table in its lowered bale receiving position.

11 Claims, 6 Drawing Figures

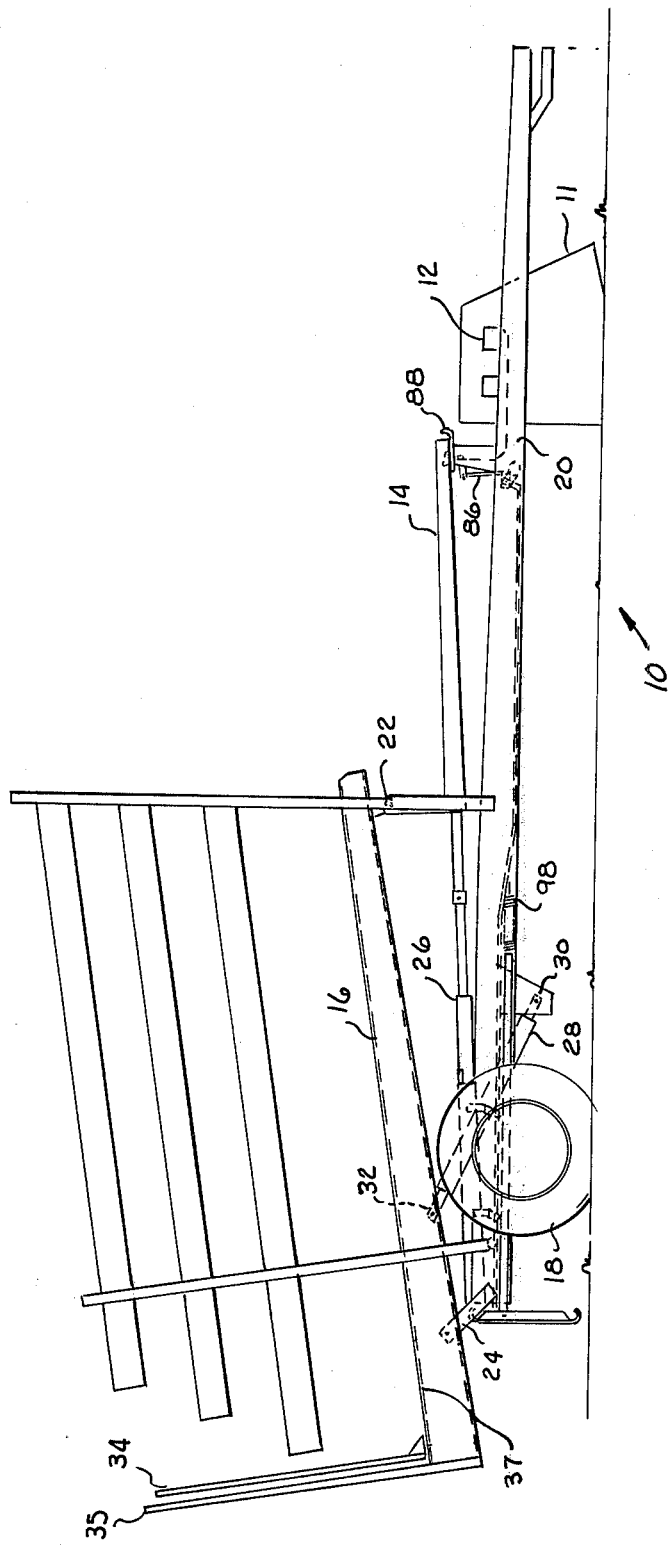

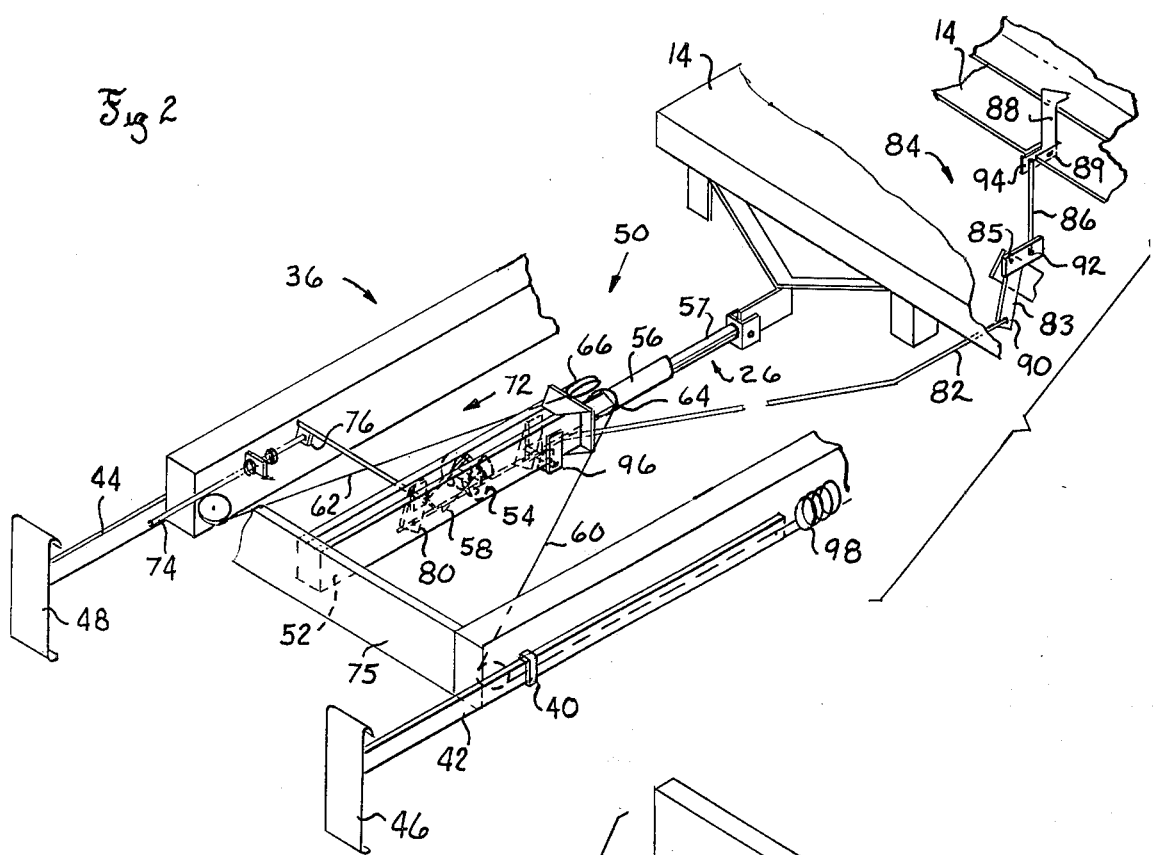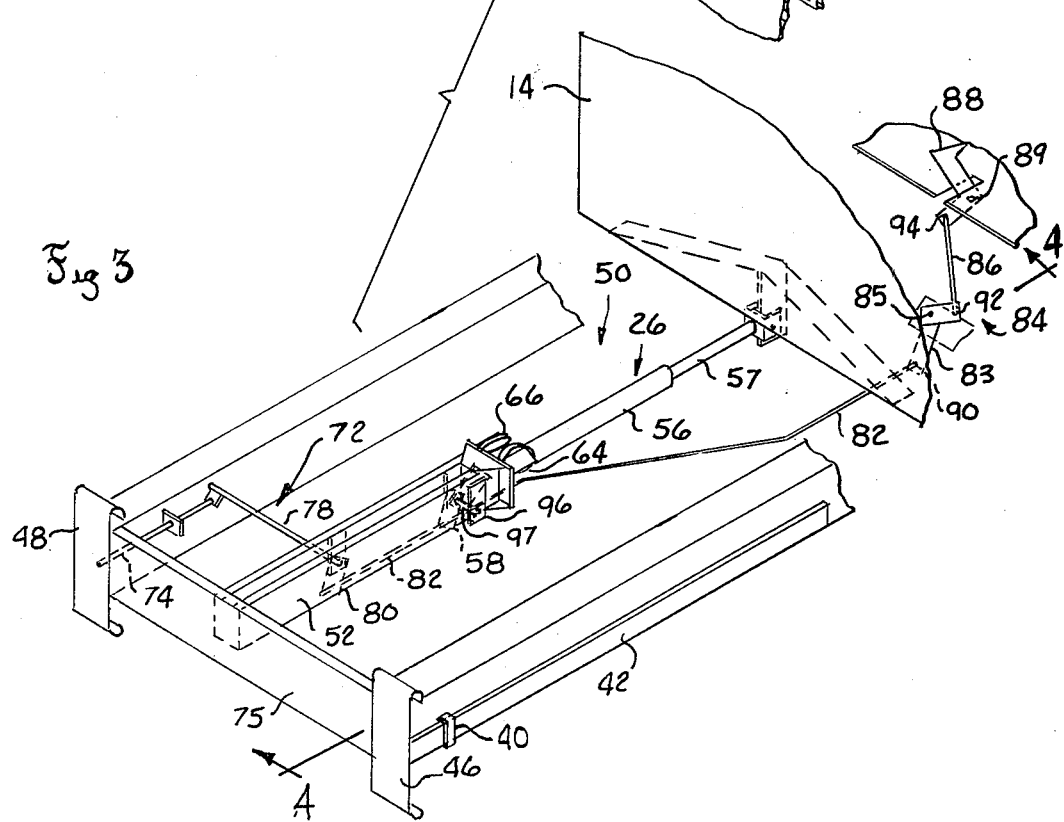

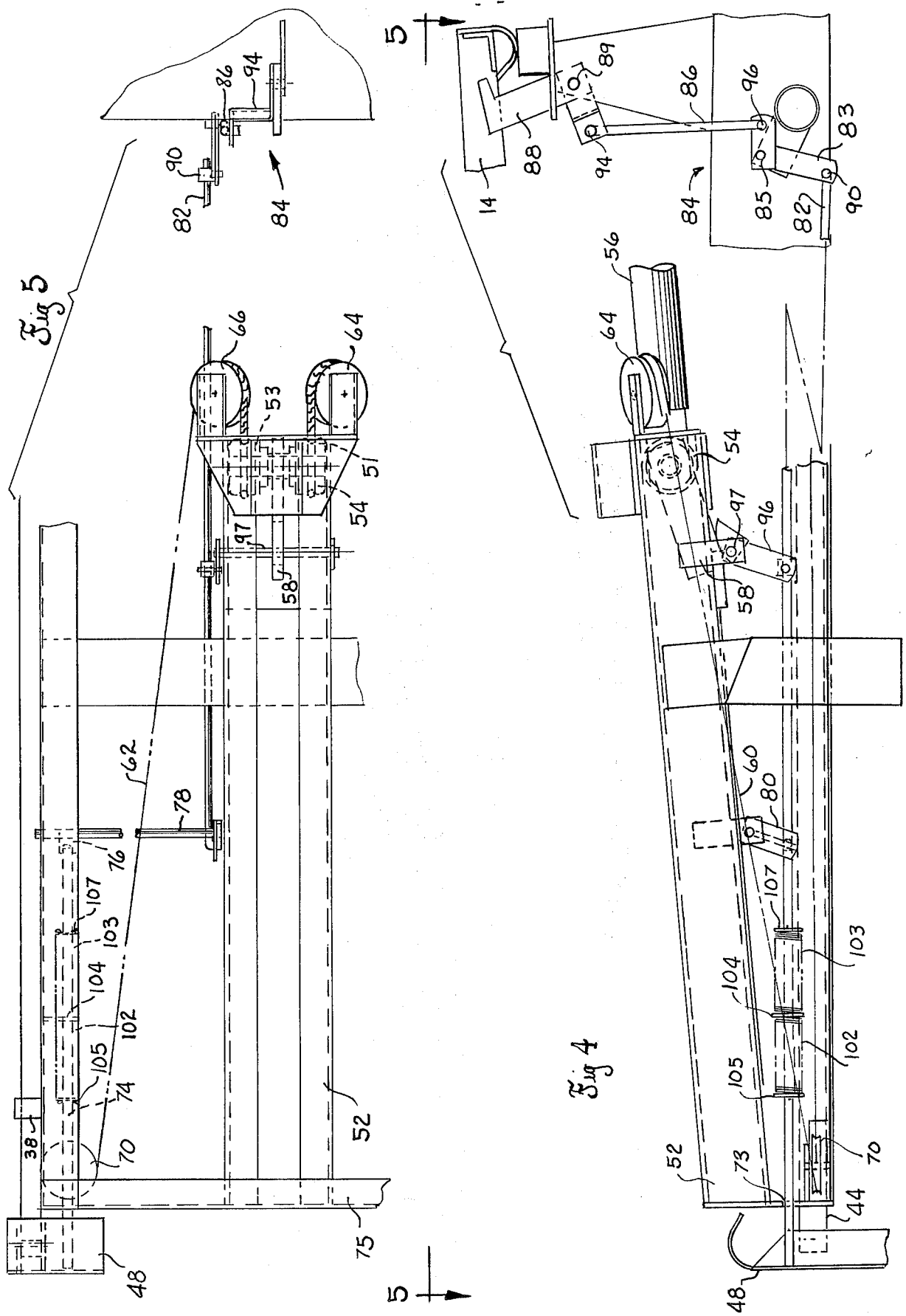

APPARATUS FOR CONTROLLING BOTH THE PUSH OFF FEET AND THE TIER FORMING TABLE OF A BALE WAGON

FIELD OF INVENTION

The present invention relates generally to agricultural machinery, and more particularly, to bale wagons of the type adapted to pick up bales one at a time, to form the bales into a stack, and to unload the stack upon the ground.

BACKGROUND OF THE INVENTION

In certain areas it is common practice to pick up bales with an automatic bale wagon of the type shown in U.S. Pat. No. 2,848,127 issued on Aug. 19, 1958 to Gordon E. Grey. The bale wagon described in the Grey patent forms the bales into stacks and then subsequently deposits the formed stack upon the ground. This patent further discloses movable push off feet, which are moved to the rear of said bale wagon when depositing the stack upon the ground. The push off feet operate to engage the stack resting vertically upon the rearmost tines and the rolling rack of the load bed. When the operator wishes to remove the stack, he tilts the load bed to its full vertical position and drives the bale wagon in a forward direction while simultaneously extending the push off feet. This simultaneous movement of the bale wagon and the push off feet effectuates a smooth transfer of the stack from the tines and rolling rack of the load bed to the ground. The push off feet of the Grey patent are controlled by hydraulic rams 59, FIG. 6, whose sole purpose is to properly position the push off feet 60 during the various operations of the bale wagon. This type of design requires additional hydraulic components to activate the rams 59 which operate push off feet 60. Since hydraulic components require a great deal of maintenance, and are generally very costly, it was deemed advantageous to eliminate portions of the hydraulic circuitry and substitute mechanical means therefor.

An alternative approach to the above configuration is illustrated in U.S. Pat. No. 3,583,578 issued June 8, 1971, to Robert M. Fachini et al. This patent utilizes a single cylinder 26, FIG. 5, to actuate the second (forming) table. Interconnected to said cylinder is a cable system operably associated with the second table so that upon vertical movement of said second table it will actuate the push off feet of the bale wagon. The operation of the Fachini bale wagon is such that when it is desired to raise only the second table the cable system remains disengaged, i.e., shaft 64, FIG. 3, remains in the saddle or concave seat 68, thereby preventing movement of said push off feet 42 and 44. However, when it is desired to actuate the push off feet J-shaped hooks 72, engage opposite ends of the shaft 64 causing it to move up and away from the saddle 68 to a raised position as indicated in FIG. 5 of the patent. As pulley 58 is carried upwardly by the movement of second table 14, cable 54 is extended thereby causing push off feet 32 to move rearwardly. It is this rearward movement which causes the pushoff feet to engage the formed stack of bales thereby enabling the stack to be removed from the wagon. The push off feet are biased in a forward or disengaged position by springs 46 which tend to pull the feet in towards their inoperative position as the second table is lowered.

It is apparent that there are several disadvantages with the construction shown in U.S. Pat. No. 3,583,578. One of these apparent disadvantages is that it would be hard to maintain shaft 64 in saddle 68 particularly when the bale wagon is traversing rough ground. A second apparent disadvantage is that, during the stack unloading operation, the second table must be in the raised position (FIG. 5) to actuate the push off feet 42 and 44, thereby blocking the view of the stack from the operator's position 18, FIG. 1, in front of the second table. This type of operation prevents the operator from observing the stack during the unloading operation thereby eliminating his effectiveness to direct the stack to a particular position. Another apparent disadvantage inherent in the Fachini patent is that due to the length of cable employed, it (the cable) can easily stretch and deform reducing the operator's control of the entire unloading operation. Also, since the length of the cable in the Fachini et al patent is very long it could cause severe injury to the operator of the bale wagon if at some time during its operation the cable snaps and flies towards the operator.

OBJECTS AND SUMMARY OF THE INVENTION

Applicants have devised a push off structure for a bale wagon which comprises push off feet, means operable to activate said push off feet as well as raising or lowering the second or tier forming table, and an interconnecting mechanism capable of controlling the operation of the activating means so as to either operate the second table of the push off feet.

It is the principle object of the present invention to provide an improved interconnecting mechanism for selectively activating the push off feet and the second table of the bale wagon which will overcome the disadvantages of the prior art referred to above.

A further object of the present invention is to provide an improved interconnecting mechanism for selectively activating the push off feet which contains nothing which can be twisted or rotated out of alignment.

Another object of the present invention resides in the use of shorter cables in the interconnecting mechanism to control the operation of a single hydraulic cylinder such that the cylinder can be utilized either to raise or lower the second table or to activate the push off feet of the bale wagon when the second table is in its lowered position.

It is a further object of the present invention to provide an improved interconnecting mechanism, for controlling the operation of the activating means so that either the push off feet or the second table of a bale wagon is operated, said improved mechanism utilizing shorter cables so that the stroke of the cylinder and thereby the cost of the cylinder can be reduced.

Another object of the present invention is to provide an improved interconnecting mechanism for selectively activating the push off feet of the bale wagon when the second or tier forming table remains in a lower horizontal position.

More particularly, it is an object of the present invention to provide an improved mechanism to control a hydraulic cylinder so that said cylinder will either activate the push off feet of the bale wagon or operate the second or tier forming table of the bale wagon.

Other objects and advantages of the present invention will become apparent and obvious from a study of the following description and the accompanying draw-

BRIEF DESCRIPTION OF THE DRAWINGS

FIG. 1 is a side elevational view of a bale wagon.

FIG. 2 is an enlarged perspective view showing the push off feet of the present invention in a rearward or extended position.

FIG. 3 is an enlarged perspective view showing the push off feet in the disengaged or forward porition.

FIG. 4 is a view taken along line 4—4 of FIG. 3.

FIG. 5 is a plan view taken along line 5—5 of FIG. 4.

DESCRIPTION OF THE PREFERRED EMBODIMENT

Figure 6:
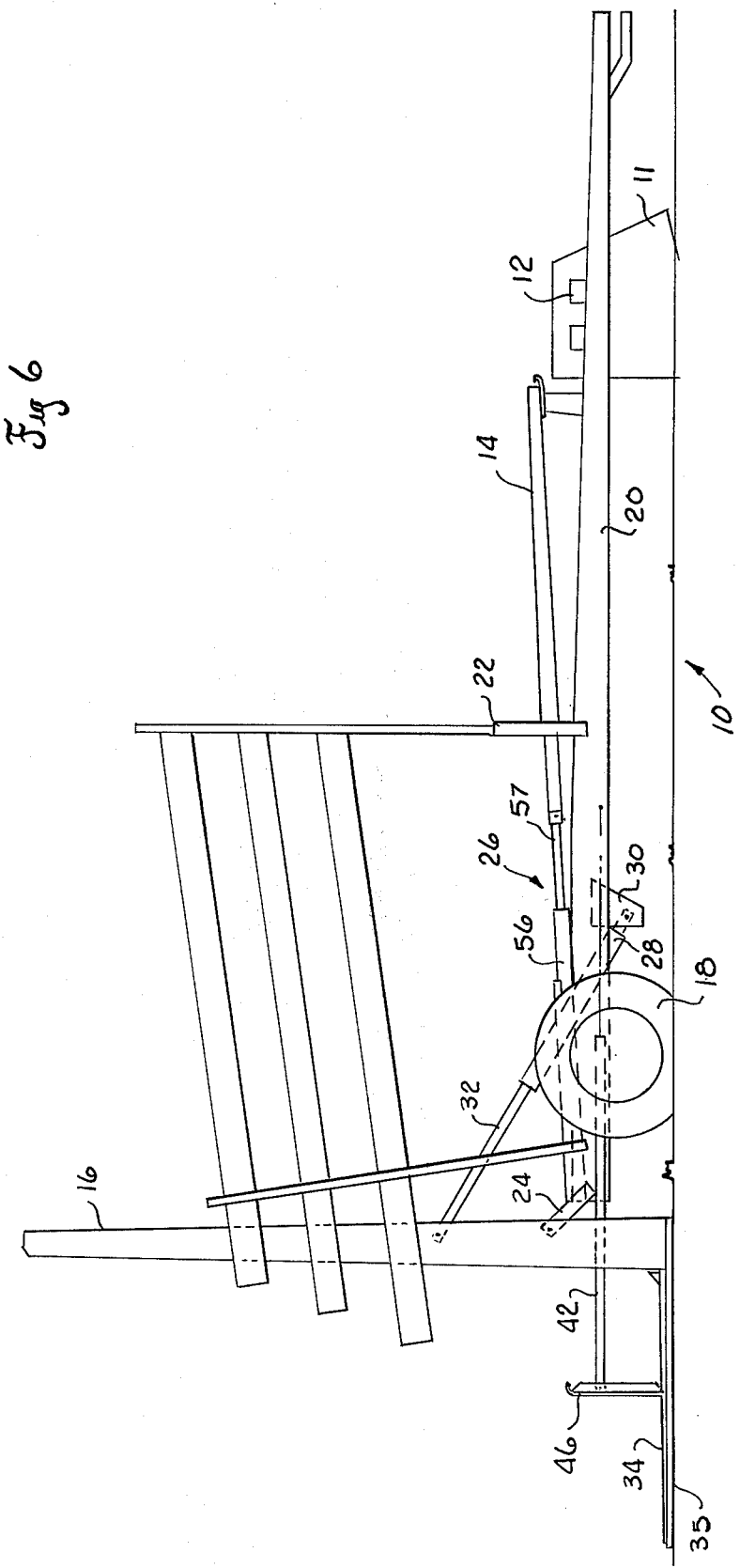
FIG. 6 is a side elevational view of a bale wagon in its stack unloading position.

In the following description, right-hand and left-hand reference is determined by standing to the rear of the bale wagon and facing the direction of travel.

With reference to the drawings, particularly FIG. 1, a side elevational view of a bale wagon is shown therein comprising a wheel supported chassis structure 10 upon which is mounted a bale pickup 11, a first table 12, a second or tier forming table 14, and a load bed 16. The chassis is mounted upon wheels 18 (only one wheel of the pair is shown) placed towards the rear of said wagon. The bale wagon as set forth in the present invention is adapted to be pulled behind a tractor and aligned with rows of bales lying on the ground so that the bales are retrieved by the bale pickup 11, and formed into layers on first table 12. These layers are then sequentially transferred onto second table 14 to form a tier of bales with a predetermined configuration. Once the tier is completed, it is then deposited as a vertical layer on load bed 16. This operation is sequentially continued until an entire stack of bales is formed on the load bed at which time the load bed is raised vertically to deposit the formed stack of bales at a desired location. The above described operation is one which has been well known in the art, and first set forth in the patent issued to G. E. Grey in U.S. Pat. No. 2,848,127 issued Aug. 19, 1958.

The chassis 10 includes a rectangular frame 20 upon which second table 14 and load bed 16 are pivotally mounted at 22 and 24 respectively. The second table 14 and the load bed 16 are adapted to be pivoted upwardly by hydraulic cylinders 26 and 28, respectively. The anchor end of cylinder 28 is rigidly secured to an extension 30 of frame member 20. When the load bed cylinder 28 is activated, its rod portion 32 is extended thereby pivoting the load bed 16 around pivot member 24. It is this actuation of the cylinder 30 which transforms the load bed from the stack forming position as shown in FIG. 1 to a stack depositing position as shown in FIG. 6. Load bed 16 includes a rolling rack 34 mounted for longitudinal movement along said load bed. Also mounted to load bed 16 are tines 35 which provide the rearmost boundary of the stack of bales as it is being formed as well as providing a rigid support upon which the bales may rest during the stack depositing operation (shown in FIG. 6).

The present invention is directed to an improved mechanism for the removal of the stack of bales from load bed 16. As shown in FIG. 2, there is provided a push off structure 36 slidably mounted below frame 20 of the bale wagon. This push off structure 36 includes channels 38 and 40 respectively which are fixed to the frame 20. These supports maintain and guide push off bars 42 and 44 of the push off structure in a proper relationship with respect to the frame 20. Mounted on the rear most end of the push off bars are feet 46 and 48. The floor of load bed 16 contains a pair of openings 37 positioned so that when the load bed is in its vertical or stack discharge position the push off feet 46, 48 are in alignment with said openings and contact a portion of the lowermost layer of bales on the load bed, as shown in FIG. 6.

The push off structure 36 is adapted to automatically move the push off bars to their furtherest most rearward position as well as securing the second table in its lowered position, during the stack discharging operation. This rearward movement is accomplished when said load bed is placed in a vertical position as set forth in FIG. 6. The actuating mechanism of push off structure 36 consists of the second table's hydraulic cylinder 26 and the improved interconnecting mechanism 50, shown in FIG. 2. The interconnecting mechanism includes a cylinder, pulley and roller assembly 54 mounted at the rear end of the barrel end 56 of second table cylinder 26. This cylinder, pulley and roller assembly contains a cylinder latching mechanism 58. Both the cylinder, pulley and roller assembly 54 and the cylinder latch mechanism 58 operate within a cylinder roller track 52 which is mounted to, and below frame 20 and which guides and maintains both the cylinder, pulley and roller assembly 54 and latching mechanism 58 in a particular longitudinal path below the bale wagon. Also included in the interconnecting mechanism 50 are cables 60 and 62 both of which have one end rigidly fastened to push off bars 42 and 44 respectively while their other ends are connected to the respective inner sides 51, 53 of cylinder roller track 52. Cables 60 and 62 extend between said cylinder roller track 52 and said push off bars 42 and 44 and also pass around cylinder, pulley and roller assembly 54, pulleys 64 and 66 horizontally mounted to the forward most end of the cylinder roller track 52, and rear most pulleys 68 and 70 positioned closest to the respective push off bars and horizontally mounted to frame 20 of the bale wagon.

Also associated with the interconnecting mechanism 50 is load rack sensor mechanism 72. This mechanism 72, includes a rigid member 74 which is supported in opening 73 of cross brace 75. Rigid member 74 has its rear most end freely positioned adjacent push off foot 48 while its other end is rigidly mounted to extension 76. This extension is secured to shaft 78 which is rotatably mounted transversely below frame 20. The right end of shaft 78 contains an extension 80 which is rigidly connected to said shaft 78 while its lower end is connected to rod 82 which proceeds longitudinally forward towards said second or tier forming table latch mechanism 84.

The second or tier forming table latch mechanism 84 comprises; L-shaped lower hook member 83 pivotally mounted at point 85 to frame 20, interconnecting link 86, and S-shaped hook member 88 pivotally mounted at point 89 to said frame structure. The forward most end of shaft 82 is connected at point 90 to the L-shaped hook portion of the second or tier forming table latch mechanism. Interconnecting link 86 has one end connected at point 92 on the L-shaped hook member while its other end is connected to point 94 of the S-shaped hook member. Connected to rod 82 and extending parallel to said cylinder latch mechanism 58 is hook 96. This hook is interconnected to the cylinder latch mechanism by control member 97. Control member 97 operates in such a way that upon forward or rearward movement of rod 82 it will either disengage or engage respectively, the cylinder latch mechanism 58.

Connected between the forward portion of the push off bars 42 and 44 and the frame 20 are springs 98 and 100. These springs are so positioned as to bias the push off bars towards a retracted position during the normal operation of the wagon. Springs 102 and 103 are disposed along rigid member 74 of the load rack sensor 72. Spring 102 is positioned between washer 105 which is mounted to member 74 and bracket 104 which is mounted to the frame of the wagon and which supports said member in a desired position. The spring 103 is positioned between bracket 104 and fixed washer 107. The combination of springs 102 and 103 tend to bias the member 74 in a rearward or disengaged position, as shown in FIG. 5.

OPERATION

During the normal stack forming operation of the bale wagon, the load rack sensor 72 is in its rearward position (FIG. 3) thereby placing both rigid member 74 and rod 82 in their forward most position so as to activate cylinder latch mechanism 58 so that the barrel end 56 of the second table cylinder 26 is anchored with reference to rod end 57. In the stack forming operation rod 82 is so positioned as as to disengage the second or tier forming table latch mechanism 84 (FIG. 3) so that upon activation of cylinder 26 the second table can pivot vertically about point 22 thereby depositing formed tiers of bales upon load bed 16. When, however, it is desired to deposit the formed stack of bales at a particular desired location, the operator will activate cylinder 28 thereby pivoting load bed 16 about point 24 until it reaches its vertical position as shown in FIG. 6. During the pivoting of load bed 16, rigid member 74, of load rack sensor mechanism 72 has been moved forward, due to the forward movement imparted to the rigid member when it is contacted by the load bed, so that extension 76 is moved in a forward direction thereby rotating shaft 78 in a counterclockwise direction (if viewed from the right-hand side of the bale wagon). This counterclockwise rotational movement which is imparted to shaft 78 creates a forward movement in rod 82 thereby simultaneously disengaging cylinder latch mechanism 58 while engaging the second or tier forming table latch mechanism 84. This simultaneous disengagement of latch mechanism 58 and the activation of second or tier forming table latch mechanism 84 allows the barrel portion of cylinder 26 to be extended rearwardly while rod end 57 remains anchored due to the latching of the second table 14 in a lowered, or bale receiving position.

Once the second table has been secured in its lower position, cylinder 26 when activated will move the cylinder, pulley and roller assembly 54 rearwardly along cylinder roller track 52. This movement exerts a force on cables 60 and 62 respectively, thereby moving push off bars 42 and 44 rearwardly such that feet 46 and 48 can be maintained in contact with the formed stack of bales so that upon movement of the bale wagon forwardly the stack will be removed from tines 35 and rolling rack 34 of load bed 16. After said stack has been removed from the tines and the rolling rack, cylinder 28 is retracted returning load bed 16 to its horizontal or stack forming position. The movement of the load bed from a vertical position (FIG. 6), to a horizontal position (FIG. 1) permits springs 102 and 103, which are in compression during the stack unloading operation, to extend rigid member 74 so that it is in its initial, or stack forming position. When the load bed is returned to its horizontal or bale forming position, shaft 78 as well as rod 82 are in their initial (rear most) position. In this position the cylinder latch mechanism 58 is activated to anchor the barrel end 56 of cylinder 26 within said cylinder roller track 52. Further, in this bale forming position the second or tier forming table latch mechanism 84 is disengaged such that any activation of cylinder 26 will cause a corresponding movement of rod end 57 so that second table 14 can perform its tier and stack forming operation.

It should be noted that during the stack forming operation the push off bars 42 and 44 are biased in a retracted, or forward position (FIG. 3) and when the stack depositing operation is in progress the second table 14 is in a lowered (horizontal), or bale receiving position (FIG. 6). This type of positioning during the respective operations of said bale wagon allows the operator to completely oversee either the stack forming or stack depositing operation without having to leave his operating station on the tractor. Further, this improved mechanism associated with cylinder 26 allows the use of one cylinder to perform two functions which were previously carried out be two individually operated hydraulic cylinders. Finally, the improved mechanism 50 set forth in this invention, is designed so that a short stroke typed cylinder can be used because the stroke will be magnified thereby allowing the individual components, i.e., push off bars 42 and 44 as well as second table 14, to perform their particular function. The utilization of a cylinder with a shorter stroke reduces the price of the hydraulic components involved causing a reduction in the entire cost of the hydraulic system of the bale wagon.

While the preferred structure in which the principles of the present invention have been incorporated is shown and described above, it is to be understood that the invention is not to be limited to such particular details, but that, in fact, widely different means may be employed in the practice of the broader aspects of the invention.

Having thus described the invention, what is claimed is:

1. A bale wagon adapted to pick up bales, form said bales into a stack, and deposit the stack upon the ground, comprising:
   a. a chassis;
   b. a tier forming table pivotally mounted to the chassis and adapted to accummulate a tier of bales, the tier forming table being movable between a lowered tier forming position and a raised stack forming position;
   c. a load bed pivotally mounted at the rear of said chassis and positioned to the rear of said tier forming table, and movable between a lowered stack forming position and a raised stack discharge position;
   d. stack push off means mounted on said chassis for movement thereof between a forward retracted position and a rearward extended position; and e. means interconnecting said tier forming table and said push off means for selectively moving said tier forming table between lowered and raised positions while maintaining the push off means in said forward retracted position, or said push off means between said forward and rearward positions while said tier forming table is maintained in its lowered position.

2. The bale wagon as set forth in claim 1 wherein:
said push off means comprises a pair of push off bars; and
said moving means includes an interconnecting mechanism, one end of which being operably associated with said tier forming table and the other end being connected to the movable push off bars to control and coordinate the operation of the push off bars and the tier forming table with respect to each other.

3. A bale wagon adapted to pick up bales, form said bales into a stack, and deposit the stack upon the ground, comprising:
   a. a chassis;
   b. a tier forming table pivotally mounted to the chassis and adapted to accummulate a tier of bales, and tier forming table being movable between a lowered tier forming position and a raised stack forming position;
   c. a load bed pivotally mounted at the rear of said chassis and positioned to the rear of said tier forming table, and movable between a lowered stack forming position and a raised stack discharge position;
   d. stack push off means mounted on said chassis for movement thereof between a forward retracted position and a rearward extended position; and
   e. means for selectively moving said tier forming table between lowered and raised positions while maintaining the push off means in said forward retracted position, or said push off means between said forward and rearward positions while said tier forming table is maintained in its lowered position, said means for moving includes an activating mechanism, one end of the activating mechanism being substantially stationary during the movement of said tier forming table, and the other end of the activating mechanism being substantially stationary during the movement of the push off means.

4. The bale wagon as set forth in claim 3 wherein said activating mechanism includes an extendible and retractable hydraulic cylinder having relatively movable rod and barrel portions, one of said portions being substantially stationary under conditions where the tier forming table is moved, and the other portion being substantially stationary under conditions where the push off means are moved.

5. The bale wagon as set forth in claim 4 wherein said push off means comprises a pair of push off bars, and said means for moving further includes:
   a. a cylinder roller track mounted on said chassis between said push off bars for maintaining the barrel portion of said hydraulic cylinder in a particular direction during its operation;
   b. a plurality of cables having one of their ends rigidly connected to said push off bars, and their other end rigidly secured to the cylinder roller track;
   c. a pair of rearwardly positioned pulleys horizontally mounted to the chassis at a position to the rear of the cylinder roller track and between the push off bars and said cylinder roller track for supporting and directing the locating of said cables;
   d. a pair of forwardly positioned pulleys horizontally mounted to either side of the forwardmost end of the cylinder roller track for supporting and directing the location of said cables;
   e. a cylinder, pulley and roller assembly mounted to the rear of the barrel end of said hydraulic cylinder and positioned within said cylinder roller track, said cylinder, pulley and roller assembly having a pair of vertically mounted pulleys for supporting and directing the location of said cables; and
   f. a pair of springs having one end mounted to said chassis and their other end mounted to the forwardmost end of said pushoff bars to bias said pushoff bars in said forward or retracted position during the stack forming operation of the bale wagon; whereby upon the securing of the portion of said cylinder which controls the movement of the tier forming table, the activation of said cylinder will cause the cylinder, pulley and roller assembly to move longitudinally within said cylinder roller track causing a force to be exerted and transmitted through the cables and around the pulleys thereby moving and extending said push off bars in a rearward direction.

6. A bale wagon adapted to pick up bales, form the bales into a stack, and deposit the stack upon the ground, which comprises:
   a. a chassis;
   b. a tier forming table pivotally secured to said chassis and movable between a lowered tier forming position and a raised stack forming position;
   c. a load bed pivotally mounted at the rear of said chassis and positioned to the rear end of said tier forming table, and movable between a lowered stack forming position and a raised stack depositing position;
   d. means mounted on said chassis for engaging the raised stack, and adapted for movement between a rearward extended position and a forward retracted position;
   e. an extendable and retractable hydraulic cylinder supported by said chassis, one end of the cylinder being interconnected to said tier forming table for movement of said tier forming table between said lowered position and said raised position, and the other end of the cylinder being operably associated with said engaging means for movement of said engaging means from said retracted forward position to said extended rearward position; and
   f. means for automatically latching one end or the other end of said hydraulic cylinder to prevent movement of the respective latched end of said cylinder so that the operation of said hydraulic cylinder can be controlled for performing either of said movements.

7. The bale wagon as set forth in claim 6 wherein said means for automatically latching comprises:
   a. a hydraulic cylinder latch mechanism connected to said other end of said cylinder for maintaining said other end of the cylinder in a fixed position so that upon activation of the cylinder it will move said tier forming table;
   b. a tier forming table latch mechanism operably associated with said one end of said cylinder and interconnected to said second table for maintaining said tier forming table in its lowered position thereby maintaining said one end of said cylinder in a fixed position so that upon activation of said cylinder it will move said engaging means; and c. a load rack sensor mechanism for automatically controlling the operation of both the hydraulic cylinder latch mechanism and the tier forming table latch mechanism.

8. The bale wagon as set forth in claim 7 wherein the load rack sensor mechanism comprises:

a. a rotatable shaft mounted on said chassis;

b. an extension rigidly mounted to one end of the shaft;

c. a rod interconnecting the extension and said tier forming table latch mechanism to control and coordinate the engagement or disengagement of said tier forming table latch mechanism with the movement of the rod;

d. a hook rigidly mounted to said rod and positioned along said rod in the immediate vicinity of said hydraulic cylinder latch mechanism;

e. a control member connecting the hook and said hydraulic cylinder latch mechanism to control and coordinate the engagement and disengagement of said hydraulic cylinder latch mechanism with the movement of said rod; and f. means for automatically activating the load rack sensor mechanism to automatically control the engagement or disengagement of said hydraulic cylinder latch mechanism and said tier forming table latch mechanism.

9. The bale wagon as set forth in claim 8 wherein the means for activating the load rack sensor mechanism comprises:

a. a rigid member having one end connected to said rotatable shaft, and its other end extending from said rotatable shaft to a position adjacent the front face of the engaging means;

b. a plurality of brackets having one end connected to said chassis and another end supporting the rigid member;

c. means for biasing said rigid member in a position adjacent the front face of said engaging means so that movement by said engaging means in a forward direction will impart a corresponding movement to said rigid member thereby activating the load rack sensor mechanism in such a way as to engage said tier forming table latch mechanism while simultaneously disengaging the hydraulic cylinder latch mechanism, and alternatively, to disengage said tier forming table latch mechanism while simultaneously engaging the hydraulic cylinder latch mechanism when said engaging means are moved rearwardly and returned to their initial position.

10. The bale wagon as set forth in claim 9 wherein the means for biasing comprises a plurality of springs spaced along said rigid member, said plurality of springs having one of their respective ends fixed to the brackets and their other ends fixed to said rigid member.

11. An improved bale wagon having a wheel supported chassis structure; a tier forming table pivotally mounted to the chassis and adapted to accummulate a tier of bales, the tier forming table being movable between a lowered tier forming position and a raised stack forming position; a load bed pivotally mounted at the rear of said chassis and positioned to the rear end of said tier forming table, and movable between a lowered stack forming position and a raised stack discharge position, said load bed having a pair of openings defined in a floor thereof; a pair of push off bars mounted on said chassis for longitudinal movement thereof between a forward retracted position and a rearward extended position; a pair of push off feet mounted to the rear most end of the push off bars, said bars being in alignment with and capable of passing through said respective openings in the floor of said load bed when said load bed is in its discharge position; wherein the improvement comprises: means interconnecting said tier forming table and said push off bars for selectively moving said tier forming table between its lowered and raised positions while maintaining the push off bars in their forward retracted position, or said push off bars between their forward and rearward positions while said tier forming table is maintained in its lowered position.

* * * * *